(12) United States Patent
Dehrmann (10) Patent No.: US 12,169,026 B2
(45) Date of Patent: Dec. 17, 2024

(54) VALVE CONTROL DEVICE FOR A COOLANT CIRCUIT OF A MOTOR VEHICLE

(71) Applicant: ECO Holding 1 GmbH, Marktheidenfeld (DE)

(72) Inventor: Sven Dehrmann, Wörth (DE)

(73) Assignee: ECO Holding 1 GmbH (DE)

( * ) Notice: Subject to any disclaimer, the term of this patent is extended or adjusted under 35 U.S.C. 154(b) by 395 days.

(21) Appl. No.: 17/503,975

(22) Filed: Oct. 18, 2021

(65) Prior Publication Data

US 2022/0120353 A1    Apr. 21, 2022

(30) Foreign Application Priority Data

Oct. 19, 2020 (DE) ............... 10 2020 127 460.2
Jun. 30, 2021 (DE) ............... 10 2021 116 913.5

(51) Int. Cl.
*F16K 11/16* (2006.01)
*F16K 31/528* (2006.01)
(Continued)

(52) U.S. Cl.
CPC ........ *F16K 11/165* (2013.01); *F16K 31/5284* (2013.01); *F16K 31/53* (2013.01); *F16K 35/14* (2013.01); *Y10T 137/87056* (2015.04)

(58) Field of Classification Search
CPC .. F16K 11/165; F16K 11/0876; F16K 11/085; F16K 11/163; F16K 35/14;
(Continued)

(56) References Cited

U.S. PATENT DOCUMENTS 2,399,460 A * 4/1946 Britton ................. F16K 11/22
251/249
2,512,894 A * 6/1950 Gieskieng .............. G03B 1/38
74/436

(Continued)

*Primary Examiner* — Craig J Price
*Assistant Examiner* — Andrew J Rost
(74) *Attorney, Agent, or Firm* — Lerner David LLP (57) ABSTRACT

Valve control device (100) for a coolant circuit of a motor vehicle, said valve control device (100) comprising a first valve (120) having an assigned first functional element (125) comprising a first engagement unit (122), a second valve (150) having an assigned second functional element (155) comprising a second engagement unit (152), wherein the first valve (120) and the second valve (150) in terms of the switch position thereof are configured so as to be variable by rotating the respective assigned functional element (125, 155), a locking mechanism (200) comprising an entrainment installation ( ), wherein the locking mechanism (200) is configured so as to be able to be driven by means of a drive (300), wherein the locking mechanism (200) in a rotating movement, by means of the entrainment installation (210) engaging in the first engagement unit (122), is configured for transferring the first functional element (125) from a first switch position to a second switch position, and/or, by means of the entrainment installation (210) engaging in the second engagement unit (152), is configured for transferring the second functional element (155) from a first switch position to a second switch position, and wherein the engagement unit (122) of the first functional element (125) comprises a first number of engagement contours (123), and the engagement unit (152) of the second functional element (125) comprises a second number of engagement contours (153), wherein the first number differs from the second number.

20 Claims, 7 Drawing Sheets

(51) Int. Cl.
*F16K 31/53* (2006.01)
*F16K 35/14* (2006.01)

(58) Field of Classification Search
CPC .... F16K 31/5284; F16K 31/528; F16K 1/165;
F16K 11/0856; F16K 31/53; F01P
2007/146; F01P 7/165; Y02T 10/70;
B60L 58/26; Y10T 137/87056; H01H
9/26
USPC ......... 137/625, 625.15, 625.46, 625.47, 862,
137/865, 636–636.2; 251/249
See application file for complete search history.

(56) References Cited

U.S. PATENT DOCUMENTS

| | | | | |
|---|---|---|---|---|
| 2,694,497 A | * | 11/1954 | Stock | F16K 31/53 |
| | | | | 251/249 |
| 3,066,208 A | * | 11/1962 | Fannon, Jr. | H01H 9/0027 |
| | | | | 200/18 |
| 3,499,465 A | * | 3/1970 | Roop | A01J 5/10 |
| | | | | 137/625.21 |
| 3,523,460 A | * | 8/1970 | Beauvais | H01H 9/26 |
| | | | | 251/249 |
| 3,855,873 A | * | 12/1974 | Fletcher | F16H 27/06 |
| | | | | 74/820 |
| 3,940,222 A | * | 2/1976 | Zink | B01D 35/12 |
| | | | | 210/420 |
| 4,013,094 A | * | 3/1977 | Niskanen | F16K 35/14 |
| | | | | 137/597 |
| 4,312,381 A | * | 1/1982 | Ratner | F16K 31/528 |
| | | | | 251/249 |
| 4,385,641 A | * | 5/1983 | Albertin | F16K 11/16 |
| | | | | 137/636.1 |
| 4,429,711 A | * | 2/1984 | Schomer | F16K 35/14 |
| | | | | 137/637.1 |
| 4,599,499 A | * | 7/1986 | Duve | H01H 43/102 |
| | | | | 74/436 |
| 4,633,980 A | * | 1/1987 | Lambertson | G07C 9/00 |
| | | | | 188/110 |
| 4,846,225 A | * | 7/1989 | Scobie | F16K 1/223 |
| | | | | 137/637.1 |
| 4,893,582 A | * | 1/1990 | Kalamon | F16K 31/46 |
| | | | | 137/553 |
| 5,615,707 A | * | 4/1997 | Pfannenschmidt | F16L 37/30 |
| | | | | 137/637.1 |
| 6,183,087 B1 | * | 2/2001 | Kirkpatrick | F16H 27/06 |
| | | | | 74/820 |
| 6,209,404 B1 | * | 4/2001 | Le | G05G 1/08 |
| | | | | 74/435 |
| 2009/0050830 A1 | * | 2/2009 | Albert | F16K 1/221 |
| | | | | 137/625.46 |

* cited by examiner

VALVE CONTROL DEVICE FOR A COOLANT CIRCUIT OF A MOTOR VEHICLE

TECHNICAL FIELD

The invention relates to a valve control unit for a coolant circuit of a motor vehicle, said valve control device comprising a first valve having an assigned first functional element comprising a first engagement unit, a second valve having an assigned second functional element comprising a second engagement unit, wherein the first valve and the second valve in terms of the switch position thereof are configured so as to be variable by rotating the respective assigned functional element.

PRIOR ART

In the prior art, numerous devices for handling fluids in electrically driven vehicles are known. Fluid devices of this type are used, for example, for switching or diverging cooling liquids within so-called thermomanagement modules of electrically operated vehicles. Step motors are used for transferring valves from a first switch position to a second switch position, for example.

The fluid devices in most instances are composed of numerous components and are of an extremely complex construction and therefore highly cost intensive. There is additionally the set of issues that an increasing number of actuators have to be used as the complexity increases, this additionally increasing the costs. Alternatively, stronger actuators have to be used in order for a plurality of rotary slides and associated seals to be able to be simultaneously moved.

The verification of the current switch position of the valve here is also often problematic. This is highly relevant after a power failure, for example. A further disadvantage results in that the valves can be adjusted out of position by parameters such as temperature, fluid pressure or other influences during the operation of a motor vehicle. In order for this to be prevented, actuators in most instances possess a holding current which can retain the valves in the switch position thereof.

This affects the force and thus also the sizing of the actuator, on the one hand. On the other hand, a continuous consumption of electricity by the entire device is necessary.

SUMMARY OF THE INVENTION

It an object of the invention to achieve a valve control device which is associated with the technical field mentioned at the outset and which at least partially overcomes the disadvantages of the prior art. It is in particular the object of the present invention to provide an improved concept for a valve control device that reduces the complexity and the costs.

The achievement of the object is defined by the features of Claim 1. According to the invention, the valve control device for a coolant circuit of a motor vehicle has a first valve having an assigned first functional element comprising a first engagement unit. Additionally, the valve control device has a second valve having an assigned second functional element comprising a second engagement unit. The first valve and the second valve in terms of the switch position thereof are configured so as to be variable by rotating the respective assigned functional element. Moreover, the valve control device comprises a locking mechanism having an entrainment installation, wherein the locking mechanism is configured so as to be able to be driven by means of a drive, and wherein the locking mechanism in a rotating movement, by means of the entrainment installation engaging in the first engagement unit, is configured for transferring the first functional element from a first switch position to a second switch position, and/or, by means of the entrainment installation engaging in the second engagement unit, is configured for transferring the second functional element from a first switch position to a second switch position. The engagement unit of the first functional element comprises a first number of engagement contours, and the engagement unit of the second functional element comprises a second number of engagement contours, wherein the first number differs from the second number.

As a result, the technical advantage that both valves can be activated by way of only one locking mechanism is achieved, for example. Consequently, also only one actuator is required for activating both valves. For example, the engagement installation comprises only one control pin by way of which the valves can be switched successively but not simultaneously. This in turn reduces the force requirements set for the actuator which drives the locking mechanism. Since the force requirements affect the sizing of the actuator, the actuator and thus the entire device can be implemented in a more compact, more lightweight and more space-saving manner. This moreover results in a cost reduction because lower force requirements are associated with lower production costs.

Each engagement contour of a functional element is preferably assigned to a specific switch position of the valve. By virtue of the different number of engagement contours of the first functional element in comparison to the second functional element, the respective assigned valves have different switch positions. This results in the advantage that symmetrical as well as non-symmetrical switching logics can be implemented in combination given an arbitrary number of switch positions and connectors of the valve control device, the latter being able to be operated by only one actuator.

According to one preferred embodiment, the locking mechanism comprises a locking contour which is configured for bearing on a locking face of the first functional element and on a locking face of the second functional element.

A locking contour in the context of the invention is to be understood to be a face which can slide along a communicating locking face of a functional element, wherein the valve assigned to the functional element cannot perform any rotation. In other words, there is a fixed spatial correlation between the entrainment installation and the locking contour. When the entrainment installation of the locking mechanism engages in the engagement contour of the first functional element and transfers the latter from a first switch position to a second switch position, the second functional element is thus fixed in the switch position thereof by the locking contour. The locking contour of the locking mechanism here slides along a locking face of the second functional element. As a result, the technical advantage that the switch position of the second valve is secured without a holding current or other means is achieved. The device thus possesses a reliable self-locking action. The switch position of the valves of the valve control device can be unequivocally established at any time without the use of sensors.

The communication between the locking contour of the locking mechanism and the locking face of each functional element can be implemented in that, for example, the locking contour as well as the locking faces are at least in part configured as shells of a cylinder. The engagement contours of a functional element are implemented, for example, by slot-type notches which in terms of the respective rotation axis of the functional element are configured in the radial direction. The entrainment installation of the locking mechanism is configured as a control pin, for example, wherein the control pin by rotating the locking mechanism can slide through the slot-type notches.

In order for functional elements of different sizes and functional elements having different switch positions to be able to be activated by means of only one locking mechanism and only one actuator, a spacing of a rotation axis R1 of the first functional element from a rotation axis RG of the locking mechanism differs from a spacing of a rotation axis R2 of the second functional element from the rotation axis RG of the locking mechanism. The more switching positions a functional element has, the more advantageous it is for the diameter of the functional element to be of a larger configuration. The corresponding spacing differential is derived in combination with a smaller functional element.

In order for non-symmetrical switching logics to also be implemented, the first functional element comprises an odd number of switch positions, and the second functional element comprises an even number of switch positions. An arbitrary number of switch positions and fluid ports which are to be switched can thus be achieved in the valve control device, the latter being able to be operated by only one actuator.

According to a particularly preferred embodiment, the valve control device comprises a terminal detent for calibrating. This results in the technical advantage that no cost-intensive sensor assembly is required in order for the valve control device to be calibrated, for example. The valve control device is thus able to be produced in a particularly cost-efficient manner and of simple construction. This is particularly advantageous after a power failure, for example.

In order for the terminal detent to be implemented in a particularly simple manner, the terminal detent is configured as a mechanical blocking unit on a functional element. For example, one of the engagement contours of the functional element can be configured so as to be closed, as a result of which the entrainment installation impacts a mechanical detent, a terminal position of the valve control device thus being reached. For example, a functional element can have four engagement contours. When one of the four engagement contours is now configured so as to be closed, the entrainment installation impacts the mechanical detent only after the respective functional element has performed a plurality of switch position changes. Application-specific solutions can thus be implemented, for example.

In order for the number of switch positions and the flexibility to be increased also for additional fluid ports, the valve control device comprises a third valve, wherein the third valve is assigned a third functional element comprising a third engagement unit. As a result, the technical advantage that a total of three valves can be activated by only one locking mechanism is achieved, for example. Consequently, also only one actuator is required for activating the three valves. If the entrainment installation comprises only one control pin, the valves can be switched successively but never simultaneously. This in turn reduces the force requirements set for the actuator which drives the locking mechanism. Since the force requirements affect the sizing of the actuator, the actuator and thus the entire device can be implemented in a more compact, more lightweight and more space-saving manner, despite the valve control device being assigned three valves. For example, the valve control device comprises more than three valves. For example, the valve control device comprises four, five, six, or even more, valves.

According to a particular embodiment, the third functional element comprises an even number of switch positions. In combination with the odd number of switch positions of the first functional element and the even number of the second functional element, there is high flexibility and a high number of switch positions of the valve control device which can be operated by only one actuator. It is particularly advantageous here that a non-symmetrical switching logic can be implemented. Alternatively, the third functional element could have an odd number of switch positions. As a result, the possibilities of the valve control device would change.

According to a particular embodiment, the first valve, the second valve and the third valve have in each case at least one rotary slide valve. As a result, the technical advantage that rotary slide valves represent existing standard solutions and are thus cost-effective and readily available is achieved, for example. The rotary slide valves are preferably configured as ball valves.

According to a particularly preferred embodiment, the first valve has five switch positions.

According to a further particularly preferred embodiment, the second valve and the third valve have in each case four switch positions.

In order for the function to be enhanced, the valve control device comprises an additional valve which is configured so as to be activatable by means of the locking mechanism. For example, the additional valve comprises a gear mechanism which can transmit the rotation of the locking mechanism to the additional valve.

According to particularly advantageous embodiment, the additional valve is configured as a proportional valve. As a result, the technical advantage that the fluid flows of the valve control device can be additionally controlled can be achieved, for example. In other words, an inflow to the valve control device or an outflow from the valve control device can be precisely controlled by means of the proportional valve. As in all other valves, the activation takes place by way of the locking mechanism, and only one actuator is required as before.

According to one additional embodiment, the valve control device comprises a housing, wherein the housing has a mounting for the locking mechanism and in each case one receptacle for each valve. For example, the housing including the mounting and the receptacles is configured from a one-piece component which is integrally made by means of injection-molding.

According to a further particularly advantageous embodiment, the housing has a plurality of fluid flow duct portions for fluidically connecting the receptacles to one another or to a fluid port. Additionally, the housing can have fluid flow duct portions for fluidically connecting the receptacles to a fluid port.

An alternative variant relates to a valve control device for a coolant circuit of a motor vehicle, said valve control device having a first valve having an assigned first functional element, a second valve having an assigned second functional element, wherein the first valve and the second valve in terms of the switch position thereof are configured so as to be variable by rotating the respective assigned first functional element and second functional element, a locking mechanism which is configured so as to be able to be driven by means of a drive, wherein the locking mechanism has a control pin for engaging in a contour of the first functional element and in a contour of the second functional element, and wherein the control pin as a function of the rotating direction of the locking mechanism is configured for transferring the first functional element from a first switch position to a second switch position, and the second functional element from a first switch position to a second switch position. As a result, the technical advantage that both valves can be activated by only one locking mechanism which has only one control pin is achieved, for example. This can take place only successively but never simultaneously, as a result of which the force requirements set for the actuator, which drives the locking mechanism, remain restricted purely to activating only one valve. Since the force requirements affect the sizing of the actuator, the actuator and thus the entire device can be implemented in a more compact, more lightweight and more space-saving manner. This moreover results in a cost reduction because lower force requirements are associated with lower production costs.

According to an advantageous variant, the locking mechanism has a locking contour which is disposed so as to be complementary to the control pin. A locking contour in the context of the invention is to be understood to be a face which can slide along a communicating locking face of a functional element, wherein the valve assigned to the functional element cannot perform any rotation. In other words, there is a fixed spatial correlation between the control pin and the locking contour. When the control pin of the locking mechanism engages in the contour of the first functional element and transfers latter from a first switch position to a second switch position, the second functional element is fixed in the switch position thereof by the locking contour which is disposed so as to be complementary to the control pin. The locking contour of the locking mechanism here slides along a locking face of the second functional element. As a result, the technical advantage that the switch position of the second valve is secured without a holding current or other means is achieved. The device thus possesses a reliable self-locking action. The switch position of the valves of the valve control device can be unequivocally established at any time without the use of sensors.

The communication between the locking contour of the locking mechanism and the locking face of the functional element can be implemented in that, for example, the locking contour as well as the locking face are at least in part configured as shells of a cylinder. The contour of a functional element is able to be implemented by a notch-type design embodiment, for example, wherein the control pin of the locking mechanism can slide along the notch-type contour.

According to a particularly preferred variant, a functional element in a plan view is configured in the manner of a saddle. There is only one contour for engaging the control pin. This contour is disposed along a longitudinal axis of the functional element. The right and the left side of the saddle correspond to the locking faces of the functional element and define in each case a partial shell of a cylinder, said partial shell in turn interacting with the shell-type surface of the locking face of the locking mechanism. This disposal of a functional element corresponds to an asymmetrical arrangement. Alternatively, the functional element can also be configured so as to be symmetrical, for example when two contours or four contours are disposed for engaging the control pin. For example, in this instance one locking face can in each case be disposed between a contour for engaging the control pin.

According to a particular variant, the locking contour and the locking pin of the locking mechanism are disposed in such a manner that the locking contour in a rotation of the locking mechanism locks a switch position of the first functional element when the control pin transfers the second functional element from a first switch position to a second switch position. Conversely, the advantages are also derived in an identical manner when the locking contour in a rotation of the locking mechanism locks a switch position of the second functional element and the control pin transfers the first functional element from a first switch position to a second switch position. Advantages which are comparable to those of the preceding embodiments are derived here.

When the control pin of the locking mechanism engages in the contour of the first functional element and transfers the latter from a first switch position to a second switch position, the second functional element is fixed in the switch position thereof by the locking contour in that the locking contour during rotation slides along the assigned locking face. As a result, the switch position of the second valve can be secured without a holding current or other means. Moreover, the switch position of the valves of the valve control device can be unequivocally established at any time without the use of sensors. There is additionally the advantage that a necessary initialization of the valve control device, for example when starting up or after a power failure, is no longer required in the sense that the actuator has to be transferred completely to the terminal positions. Instead, the initialization takes place automatically when starting up, since the position of the functional elements is unequivocally correlated with the position of the locking mechanism.

In order for the valve control device to be used in a more diverse manner, the valve control device has a third valve having an assigned third functional element. The control pin as a function of a rotation of the locking mechanism is configured for transferring the first functional element from a first switch position to a second switch position, and the second functional element from a first switch position to a second switch position, and the third functional element from a first switch position to a second switch position. As a result, the advantage that a total of three valves can be activated by only one locking mechanism which has only one control pin is achieved, for example. The activation can likewise take place only successively but never simultaneously, as a result of which the force requirements set for the actuator which drives the locking mechanism remain restricted purely to only activating one valve. The actuator and the entire device can be implemented in a more compact, more lightweight and more cost-effective manner.

In order for the valve control device to be used in an even more diverse manner, the valve control device has a fourth valve having an assigned fourth functional element. The control pin as a function of the rotation of the locking mechanism is configured for transferring the first functional element from a first switch position to a second switch position, and the second functional element from a first switch position to a second switch position, and the third functional element from a first switch position to a second switch position, and the fourth functional element from a first switch position to a second switch position. The same technical advantages are derived as have already been set forth in the preceding embodiment. A total of four valves are activated by only one locking mechanism which has only one control pin. Since the activation can take place only successively but never simultaneously, the force requirements set for the actuator which drives the locking mechanism remain restricted to activating only one of the four valves. The actuator and the device can be implemented in a more compact, more lightweight and more cost-efficient manner.

In a further advantageous variant, the locking mechanism has a second control pin for engaging in a contour of the functional elements. As a result, the technical advantage is achieved that, for example, two functional elements and thus two valves can be simultaneously activated.

In order for a valve control device having a reliable self-locking action to be implemented, the locking mechanism has a locking contour which is disposed so as to be complementary to the first control pin and to the second control pin. The locking contour here is to be able to slide along a communicating locking face of a functional element, wherein the valve assigned to the functional element cannot perform any rotation. When the first control pin of the locking mechanism thus engages in a contour of a first functional element and transfers the latter from a first switch position to a second switch position, at least one second functional element is fixed in the switch position thereof by the locking contour. The specific arrangement of the control pin and of the locking contour here can be designed so as to be symmetrical or else asymmetrical so as to meet the respective purpose and the control system of the valves. In other words, the locking contour does not mandatorily have to be disposed so as to be opposite the first or the second control pin. It is also possible for the locking contour to be disposed asymmetrically between the first or the second control pin.

According to an additional variant, the locking mechanism has a third control pin for transferring a functional element from a first switch position to a second switch position. As a result, advantages similar to those as have already been described in the context of the preceding embodiments can be achieved in principle. For example, three functional elements and thus three valves can be simultaneously activated.

In a further advantageous variant, the locking mechanism has a fourth control pin for engaging in a contour of the functional elements. As a result, the technical advantage that four functional elements and thus four valves can be simultaneously activated is achieved, for example.

In order for the valve device to be equipped with further switch functions and with an additional safety function, the valve control device has a second locking mechanism which is configured so as to be able to be driven by means of a further drive. As a result, the technical advantage is achieved, for example, that two locking mechanisms can be connected in a mutually independent manner to a functional element. In other words, a valve can be activated by two different actuators, this securing the functional capability of the valve device in the event of a defect in an actuator.

According to a particular variant, the first valve as well as the second valve are in each case configured as a 4/2-way valve. The advantages of this embodiment become evident in particular in the context of one locking mechanism and only one control pin. Both 4/2-way valves can thus be switched by means of one actuator, wherein by virtue of the single control pin the force requirements set for the actuator remain restricted to activating only one valve. The actuator and thus the entire valve control device can be configured in a more compact, more lightweight and more cost-effective manner.

In a particular variant, the locking mechanism having the functional elements comprises in each case four switch positions.

In order for the device according to the invention to be produced in an ideally cost-effective manner and by means of standard components, at least the first valve and the second valve are in each case assigned one rotary slide, wherein each rotary slide has a duct which mutually connects two adjacent ports to the respective valve. For example, the rotary slides are mounted in a floating manner as "floating balls". Seals which serve for sealing the fluid, on the one hand, and for guiding and positioning the rotary slide, on the other hand, are additionally situated on the respective ports.

In order for a cost-efficient production and a flexible modularity based on a standardized valve architecture to be enabled, the valves are configured as single ball valves.

According to a particularly preferred variant, the valve control device is assigned to a heat exchanger. In combination with two 4/2-way valves there are at least three switching combinations which can be activated by only one locking mechanism and only one actuator.

Further advantageous embodiments and combinations of features of the invention are derived from the detailed description hereunder and the entirety of the patent claims.

BRIEF DESCRIPTION OF THE DRAWINGS

In the drawings used for explaining the exemplary embodiment.

In principle, identical parts are provided with the same reference sign in the figures.

WAYS OF IMPLEMENTING THE INVENTION

Figure 1:
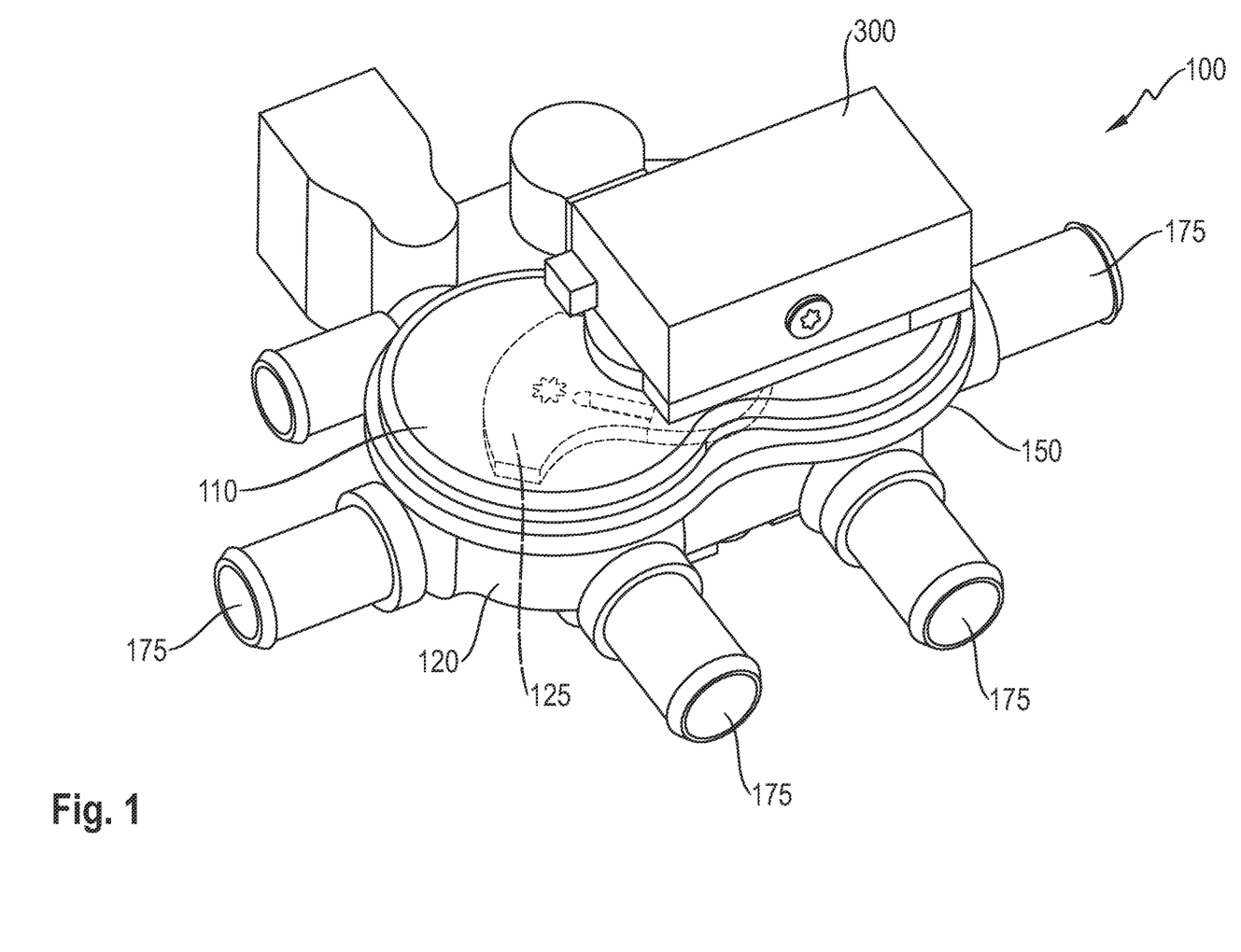
FIG. 1 shows a first variant valve control device.

FIG. 1 shows a first variant of a valve control device 100 according to the invention. The valve control device 100 is configured for controlling a coolant circuit of a motor vehicle. The valve control device 100 comprises a first valve 120 having an assigned first functional element 125, and a second valve 150 having an assigned second functional element (not shown). The first valve 120 and the second valve 150 are configured as 4/2-way valves and disposed in parallel within a housing 110. A drive 300 in the form of an electrically operated actuator for activating the valve control device 100 is disposed above the housing 110. A plurality of ports 175 for supplying or discharging fluid such as coolant, for example, protrude laterally from the housing 110 and from below the latter.

Figure 2:
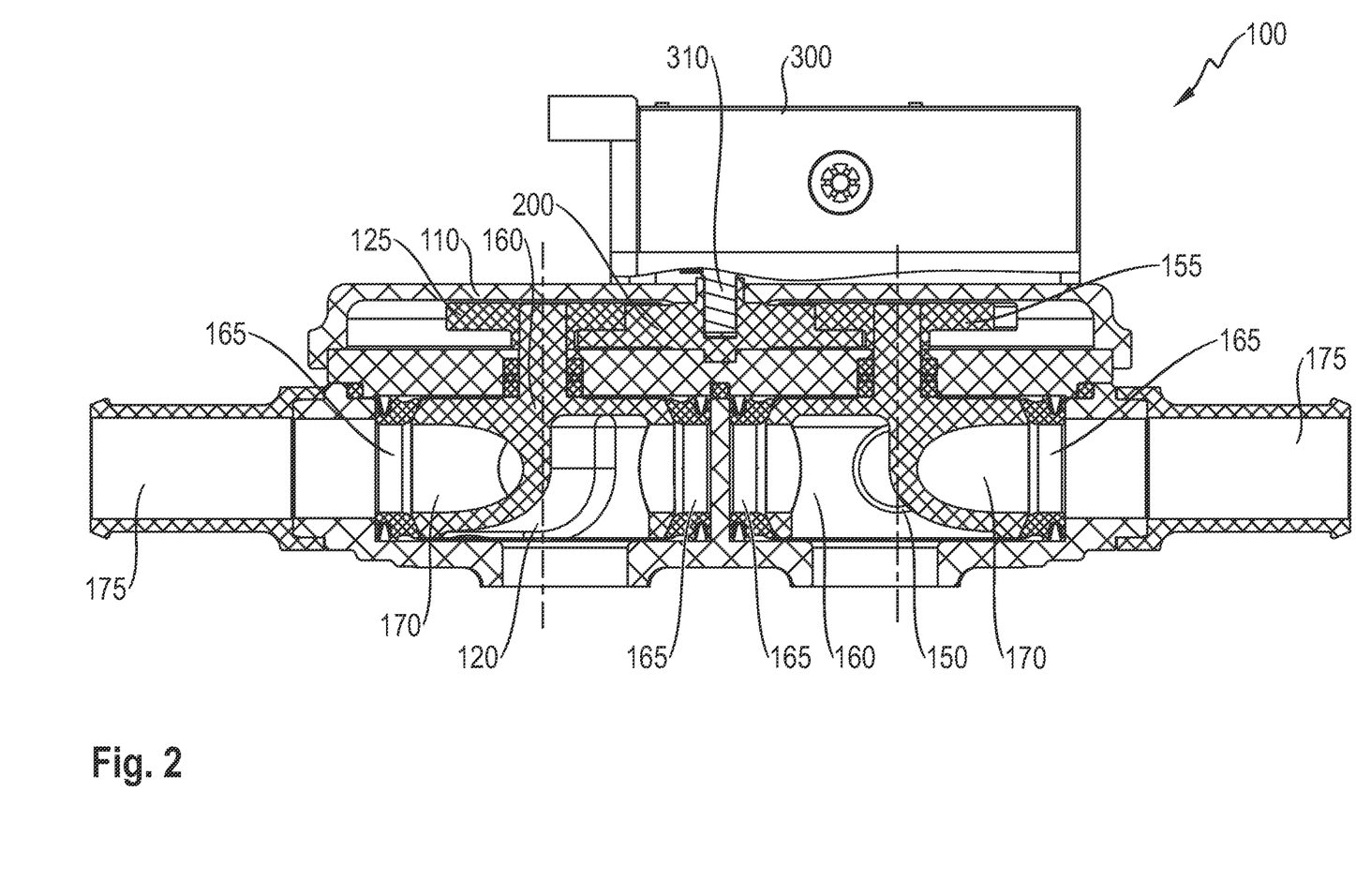
FIG. 2 shows a second valve control device in a lateral sectional view.

FIG. 2 shows a second variant of a valve control device 100 according to the invention in a lateral sectional view. The drive 300 is disposed on the upper side of the valve control device 100. The drive 300 serves for activating the valve control device 100, wherein the drive 300 by way of a drive shaft 310 transmits a rotating movement to a locking mechanism 200. A first valve 120 and a second valve 150 are situated below the locking mechanism 200. The first valve 120 is assigned a first functional element 125, and the second valve 150 is assigned a second functional element 155. The first valve 120 as well as the second valve 150 in terms of the switch position thereof are configured so as to be variable by rotating the respective assigned first functional element 125 and second functional element 155. The first functional element 125 and the second functional element 155 here are operatively connected directly to the locking mechanism 200, wherein the locking mechanism 200 has only one control pin (not shown) for engaging in a contour (not shown) of the first functional element 125 and in a contour of the second functional element 155. By rotating the locking mechanism 200, this being caused by the drive 300 and transmitted to the locking mechanism 200 by way of the drive shaft 310, the control pin can interact either with the first functional element 125 or the second functional element 155. Consequently, the first functional element 125 is transferred from a first switch position to a second switch position, and the second functional element 155 is transferred from a first switch position to a second switch position, as a function of a rotating direction of the locking mechanism 200. Both valves can thus be activated by only one locking mechanism 200 which has only one control pin 210. This can take place only successively but never simultaneously, as a result of which the force requirements set for the drive 300 remain restricted purely to activating only one valve 120, 150. The first valve 120 as well as the second valve 150 comprise in each case one rotary slide 160 in the form of a single ball valve. Each rotary slide 160 comprises a duct 170 which connects two adjacent ports 157 of each valve to one another. In order for the rotary slides 160 to be positioned within each valve 120, 150 and an egress of fluid from the housing 110 to be prevented, each port 157 comprises an assigned seal 165.

Figure 3:
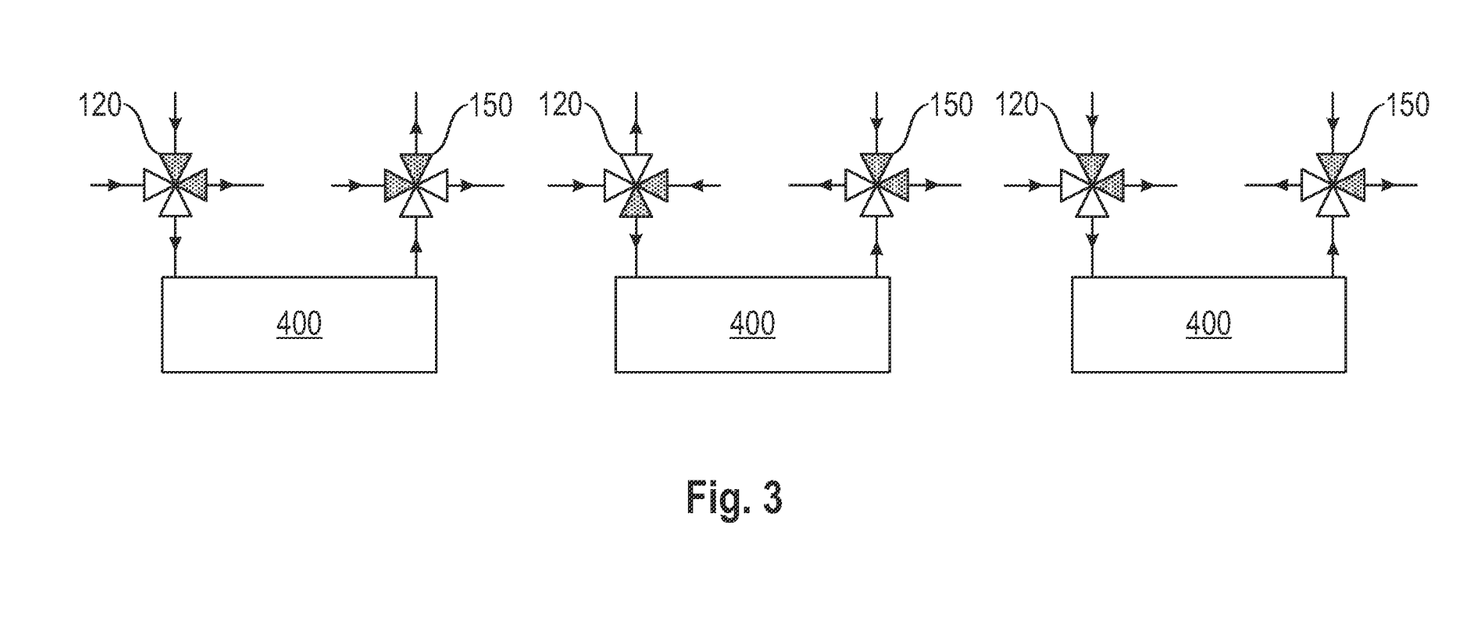
FIG. 3 shows a plurality of schematic illustrations of two valves in conjunction with a heat exchanger.

FIG. 3 shows a plurality of schematic illustrations of two valves 120, 150 in conjunction with a heat exchanger 400. The first valve 120 as well as the second valve 150 are in each case configured as a 4/2-way valves. The illustrations show three different switching combinations. Each valve 120, 150 per se possesses four switch positions, each being disposed so as to be offset by 90° from the other. The switching combinations illustrated differ in each case only in terms of a mutually changed switch position of either the first valve 120 or the second valve 150. In other words, the illustrated arrangement of two valves can be operated by means of the valve control device (not shown) according to the invention. Required to this end is only one locking mechanism having only one control pin in order for both valves 120, 150 to be activated by means of one drive. As is shown in the illustrations, the switching of a valve 120, 150 from a first switch position to a second switch position takes place only successively but never simultaneously.

Figure 4A:
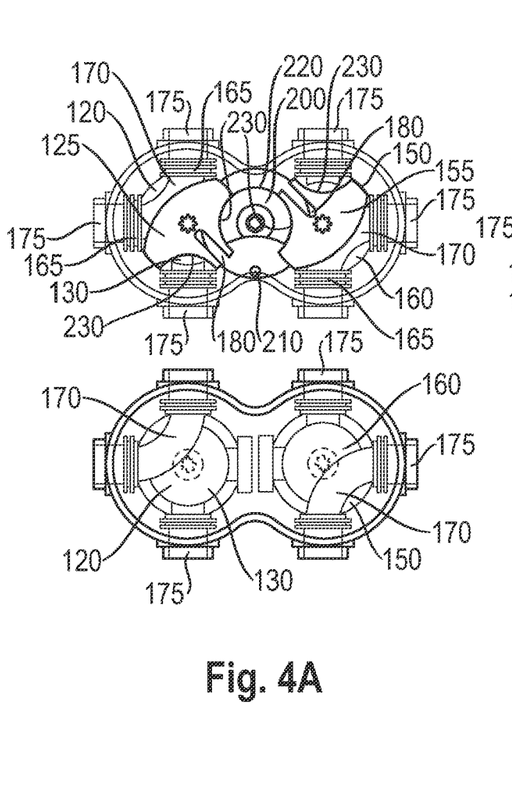
FIGS. 4A-4C show two 4/2-way valves in different switch positions.
Figure 4B:
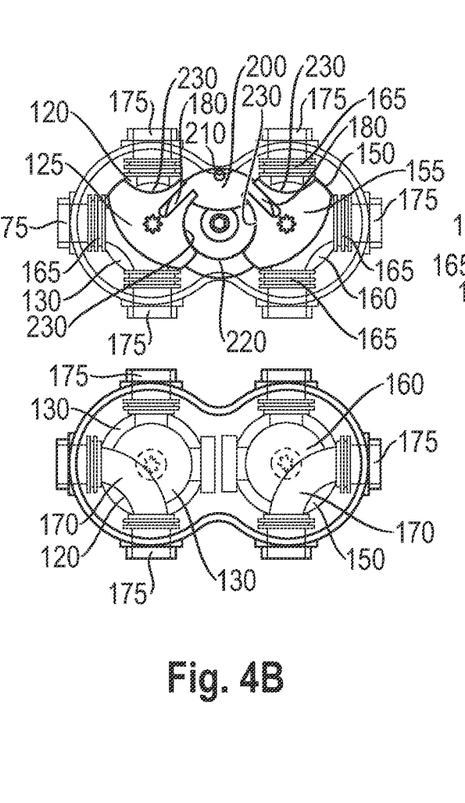
Figure 4C:
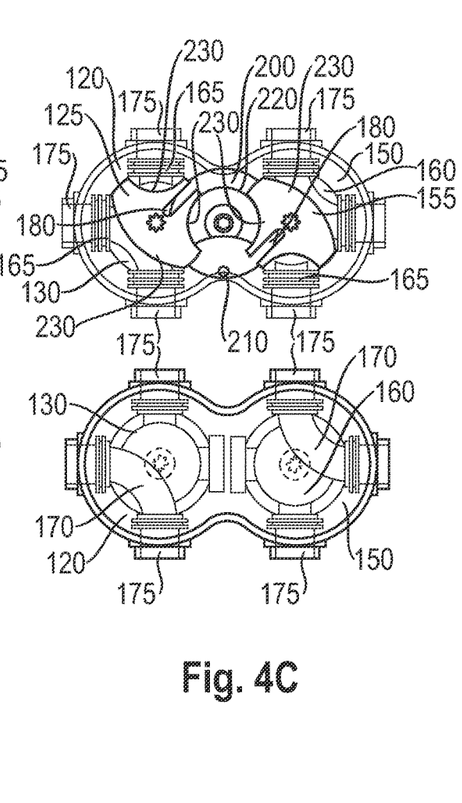

FIGS. 4A-4C show in each case two 4/2-way valves in different switch positions. The lower illustration of FIG. 4A shows two 4/2-way valves 120, 150 disposed in parallel in a switch position. Each of the two valves 120, 150 possesses four switch positions, each being disposed so as to be offset by 90° from the other. The valves 120, 150 additionally possess in each case three ports 175 which in the radial direction extend away from the valves 120, 150. A fourth port (not shown) is situated below each valve 120, 150. The valves 120, 150 have in each case one rotary slide 130. The rotary slide 130 comprises a duct 170 which connects two adjacent ports 175 of the respective valve 120, 150 to one another. The upper illustration of FIG. 4A shows the identical features of the lower illustration. A repetition of the description of the identical features is dispensed with. The upper illustration additionally comprises a locking mechanism 200 which is disposed so as to be centric between the two valves 120, 150 and is able to be driven in the rotating manner by means of a drive (not shown). The locking mechanism 200 possesses only one control pin 210 as well as one locking contour 220 which is disposed so as to be complementary to the control pin 210. A first functional element 125 and a second functional element 155 lie on the left side and the right side of the locking mechanism 200. The functional elements 125, 155 in the present embodiment are asymmetrically configured and comprise in each case one contour 180 for receiving the control pin 210, and in each case two locking faces 230. The locking contour 220 of the locking mechanism 200 and the locking faces 230 of the first and the second functional element 125, 155 are in part configured as a shell of a cylinder. The contour 180 of the functional elements 125, 155 is implemented by a notch-type design embodiment, wherein the control pin 210 of the locking mechanism 220 can engage in the contour 180 and slide along the notch-type contour 180. The functional elements 125, 155 in a plan view are configured in the manner of a saddle. The first functional element 125 is assigned the first valve 120, and the second functional element 155 is assigned the second valve 150. The first valve 120 as well as the second valve 150 in terms of the switch position thereof are configured so as to be variable by rotating the respective assigned first functional element 125 and second functional element 155. The first functional element 125 and the second functional element 155 are operatively connected directly to the locking mechanism 200, wherein the control pin 210 of the locking mechanism 200 is configured for engaging in a contour 180 of the first functional element 125 and in a contour 180 of the second functional element 155. By rotating the locking mechanism 200, this being caused by the drive 300 (not shown), the control pin 210 can interact either with the first functional element 125 or the second functional element 155. As a function of a rotating direction of the locking mechanism 200, the first functional element 125 is thus transferred from a first switch position to a second switch position, and the second functional element 155 is also transferred from a first switch position to a second switch position. The locking contour 220 is disposed on the locking mechanism 200 so as to be opposite the control pin 210. When the control pin 210, as a result of a rotation of the locking mechanism 200 to the right, engages in a contour 180 of the first functional element 125, the latter is transferred from a first switch position to a second switch position. On the opposite side of the locking mechanism 200, the second functional element 155 in terms of the switch position thereof is fixed by the locking contour 220 which is disposed so as to be complementary to the control pin 210. The locking contour 220 of the locking mechanism 200 here slides along a locking face 230 of the second functional element 155. When the control pin 210, as a result of a rotation of the locking mechanism 200 to the left, engages in a contour 180 of the second functional element 155, the latter is transferred from a first switch position to a second switch position. On the opposite side of the locking mechanism 200, the first functional element 125 in terms of the switch position thereof is fixed by the locking contour 220 which is disposed so as to be complementary to the control pin 210. The locking contour 220 of the locking mechanism 200 here slides along a locking face 230 of the first functional element 125. Additionally, seals 165 are situated on all of the ports 175, said seals 165 serving for sealing the fluid, on the one hand, and for guiding and positioning the rotary slide 160, on the other hand. The illustrations of FIG. 4B show the identical 4/2-way valves 120, 150 disposed in parallel. In comparison to the illustration according to FIG. 4A, the rotary slide 130 of the first valve 120 is situated in a switch position which has changed by 90°. A repetition of the description of identical features of the preceding figure is dispensed with. The illustrations of FIG. 4C show the identical 4/2-way valves 120, 150 disposed in parallel. In comparison to the illustration according to FIG. 4A and the illustration according to FIG. 4B, the rotary slide 130 of the second valve 150 is situated in a switch position which has changed by 90°. A repetition of the description of identical features of the preceding figure is dispensed with.

Figure 5:
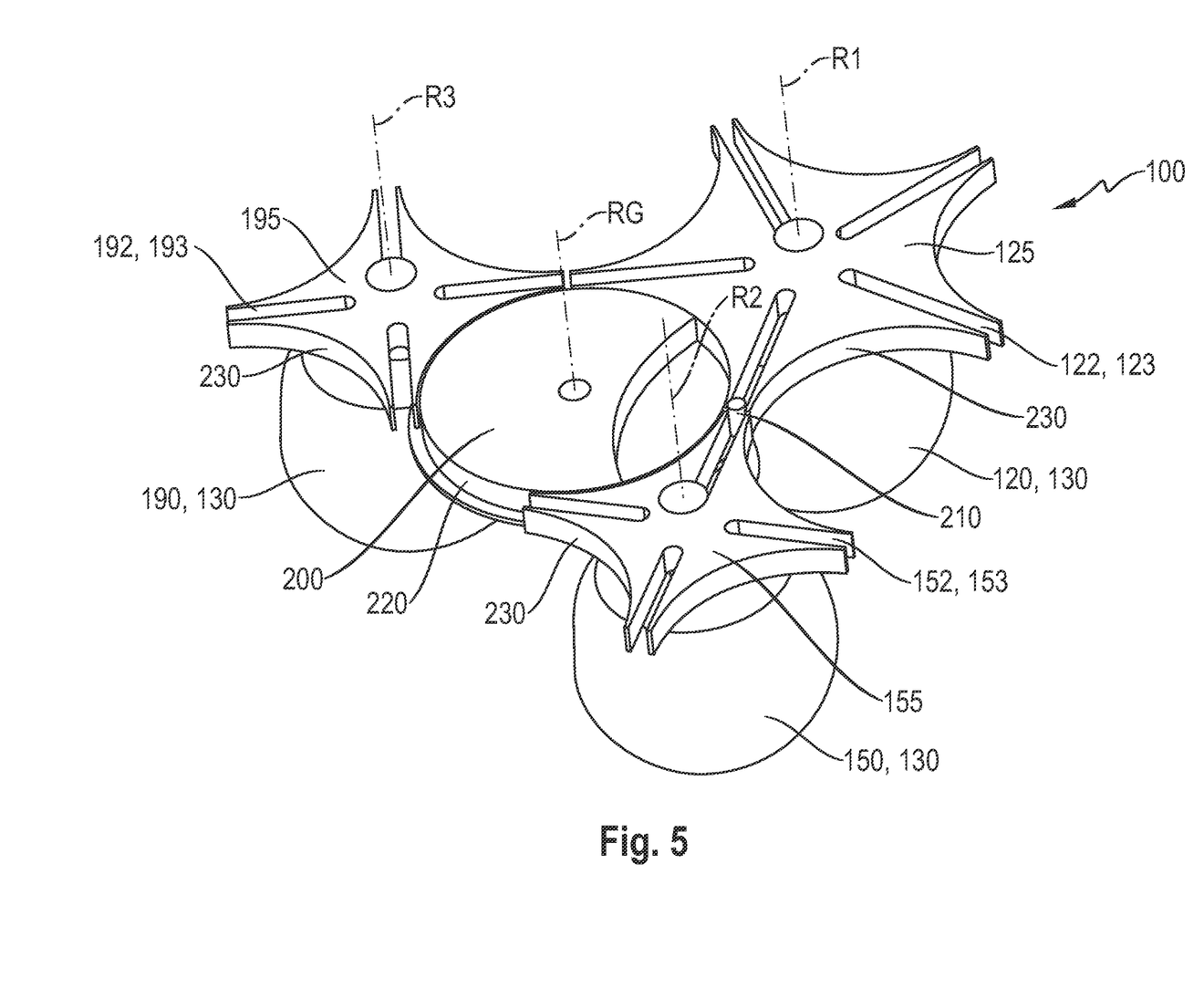
FIG. 5 shows an illustration of a valve control device according to the invention.

FIG. 5 shows a valve control device 100 according to the invention for a coolant circuit of a motor vehicle. The valve control device 100 comprises a first valve 120, a second valve 150 a third valve 190. Each valve 120, 150, 190 on a lower portion has a spherical rotary slide valve 130. Each valve 120, 150, 190 on an upper portion comprises a fixedly connected functional element 125, 155, 195.

The respective fixedly assigned valve 120, 150, 190 in terms of the switch position thereof can be varied by rotating the functional elements 125, 155, 195. The first valve 120 is assigned the first functional element 125, the second valve 150 is assigned the second functional element 155, and the third valve 190 is assigned the third functional element 195. The functional elements 125, 155, 195 are configured so as to be star-shaped and have in each case one engagement unit 122, 152, 192 which in turn is composed of a plurality of engagement contours 123, 153, 193. The first functional element 125 thus comprises a first engagement unit 122 which is composed of a total of five engagement contours 123. The five engagement contours 123 are configured as radially configured slots which are in each case open at the radial end. Additionally, the first functional element 125 comprises a rotation axis R1 of the first functional element.

The second functional element 155 is configured so as to be smaller than the first functional element 125. The second functional element 155 has a total of four engagement contours 153 which are likewise configured as radially configured slots which are embodied so as to be open at the radial end. The four engagement contours 153 conjointly form the second engagement unit 152. The second functional element 155 additionally comprises a rotation axis R2 of the second functional element.

The third functional element 195 comprises a third engagement unit 192 which is composed of a total of four engagement contours 193. As has been shown already in the case of the second functional element 155, the four engagement contours 193 are configured as radially configured slots which are embodied so as to be open at the radial end. The third functional element 195 additionally comprises a rotation axis R3 of the third functional element.

The locking mechanism 200 is situated in a central position between the first functional element 125, the second functional element 155 and the third functional element 195. The locking mechanism 200 is configured as a rotatable cylindrical disk body which has an entrainment installation 210 in the form of a control pin. The entrainment installation 210 is situated so as to be radially outside on the locking mechanism 200 and serves for engaging in the engagement contours 123, 153, 193 of the respective functional elements 125, 155, 195. As a result of the rotation of the locking mechanism 200, the entrainment installation 210 engages in the engagement contours 123, 153, 193, configured in the shape of slots, of the respective functional elements 125, 155, 195 and transfers the respective functional element 125, 155, 195 from one switch position to the next switch position. The locking mechanism 200 can be operated by only one drive 300 (not shown) and herein rotates about the rotation axis RG of the locking mechanism 200.

All of the rotation axes R1, R2, R3, RG are disposed so as to be mutually parallel.

A locking contour 220 is situated on a radial external side of the locking mechanism 200. The locking contour 220 serves for placing the locking mechanism 200 so as to bear on locking faces 230 that are in each case assigned to the functional elements 125, 155, 195. The locking contour 220 of the locking mechanism 200 is configured as a shell of the cylindrical disk body. When the entrainment installation 210 of the locking mechanism 210 engages in the engagement contour 123, 153, 193 of a functional element 125, 155, 195 and transfers the latter from a first switch position to a second switch position, the other functional elements 125, 155, 195 in terms of the switch position thereof are fixed by the locking contour 220. The locking contour 220 of the locking mechanism 200 here slides along the locking faces 230 of the remaining functional elements. As a result, the switch position of the remaining valves 120, 150, 190 is secured without a holding current or other means, and the use of sensors for establishing the switch position of the individual valves 120, 150, 190 of the valve control device 100 is no longer mandatorily required.

Figure 6:
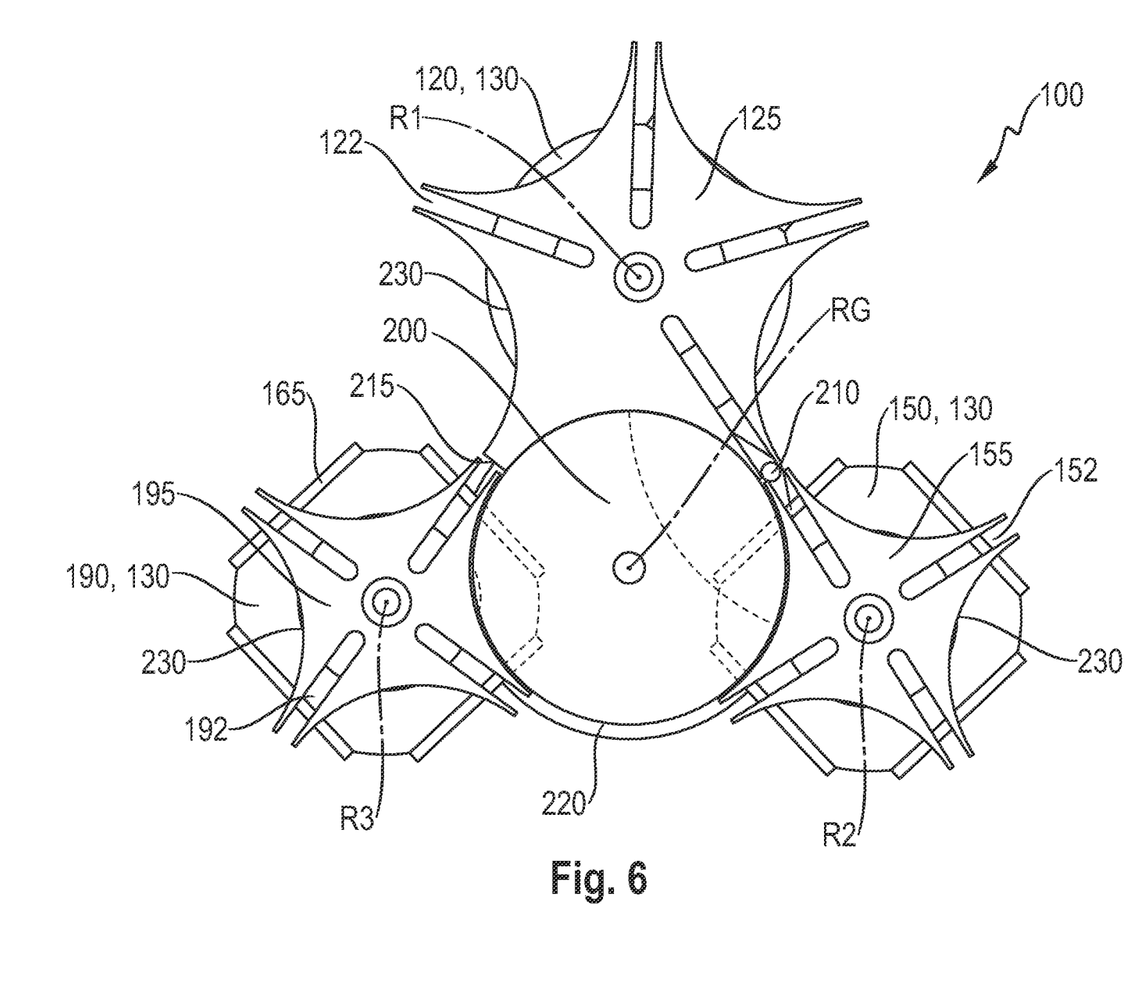
FIG. 6 shows a valve control device according to the invention in the plan view.

FIG. 6 shows a valve control device 100 according to the invention in the plan view. The valve control device 100 comprises the first valve 120, the second valve 150 and the third valve 190. Each valve 120, 150, 190 is assigned a spherical rotary slide valve 130 and a fixedly connected functional element 125, 155, 195. The functional elements 125, 155, 195 are configured so as to be star-shaped and have in each case one engagement unit 122, 152, 192 which in turn is composed of a plurality of engagement contours 123, 153, 193. The first functional element 125 has the first engagement unit 122 which is configured from five engagement contours 123, wherein one of the engagement contours 123 is configured as a blocking unit 215. The blocking unit 215 is configured by a closed engagement contour 123 and on the end side comprises a detent face 215. The entrainment installation 210, after a plurality of switch position changes of the first functional element 125, thus impacts the mechanical detent, as a result of which a terminal position of the valve control device 100 is reached. Apart from this exemplary embodiment, further application-specific solutions may be implemented.

The second functional element 155 has the second engagement unit 152 having four engagement contours 153, and the third functional element 195 comprises the third engagement unit 192 which is composed of a total of four engagement contours 193. All of the rotation axes R1, R2, R3, RG are aligned so as to be mutually parallel, and the spacing between the rotation axis R1 of the first functional element 125 and the rotation axis RG of the locking mechanism 200 is larger than the spacing between the rotation axis R2 of the second functional element 155 and the rotation axis RG of the locking mechanism 200. Likewise, the spacing between the rotation axis R1 of the first functional element 125 and the rotation axis RG of the locking mechanism 200 is larger than the spacing between the rotation axis R3 of the third functional element 195 and the rotation axis RG of the locking mechanism 200.

The spherical rotary slide valve 130 of the first valve 120 and of the third valve 150 comprises in each case four seals 165 which are assigned to the four switch positions of the two valves 120, 150.

Figure 7:
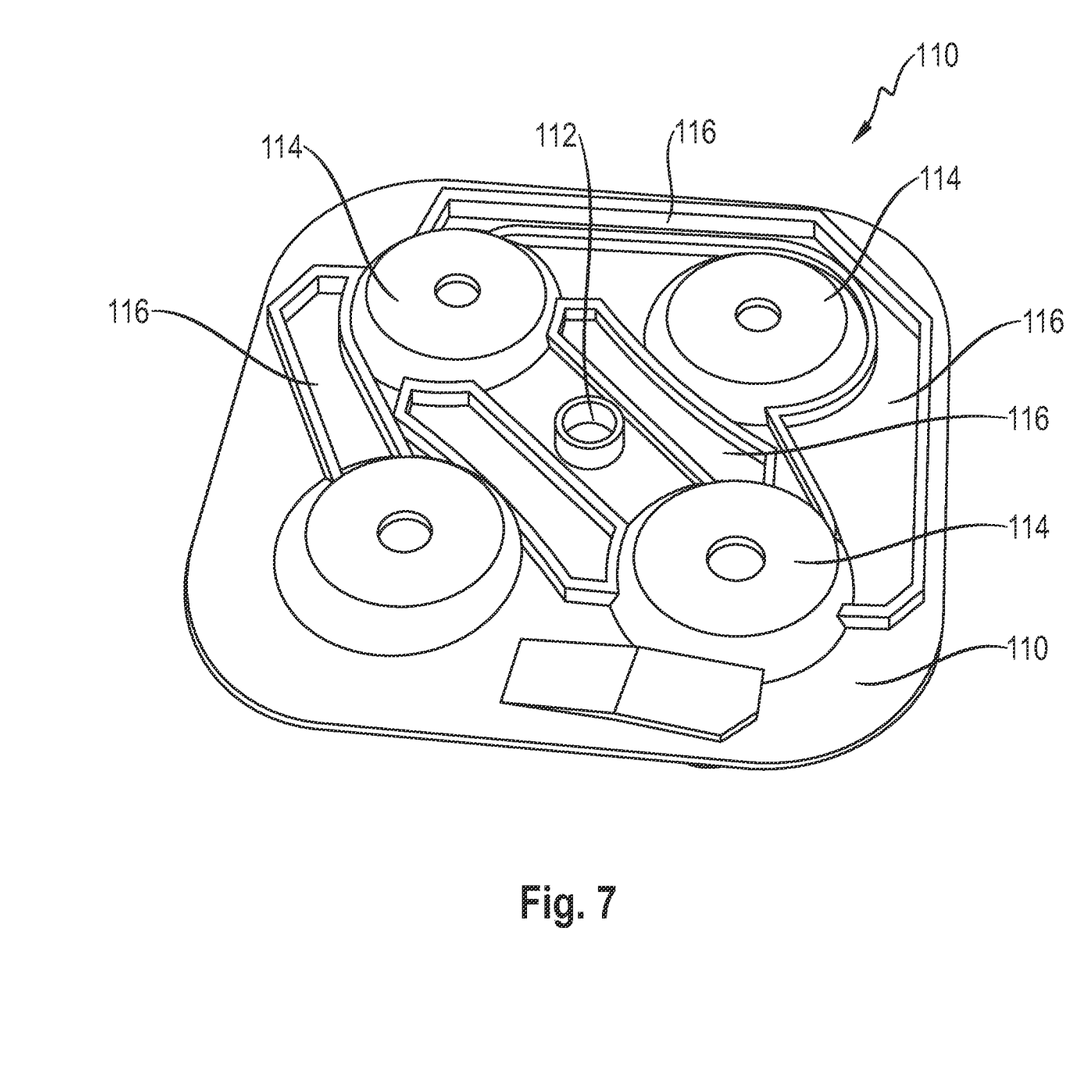
FIG. 7 shows a housing for the valve control device according to the invention.

FIG. 7 shows a housing 110 for the valve control device 100 according to the invention. The housing 110 is configured so as to be planar and comprises a mounting 112 for the locking mechanism 200. One receptacle 114 for each valve 120, 150, 190 is in each case provided for receiving the valves 120, 150, 190 in the housing 110.

Additionally, the housing 110 comprises a plurality of fluid flow duct portions 116 which are configured so as to fluidically connect the receptacles 114 to one another. Alternatively, the fluid flow duct portions 116 are configured for fluidically connecting the receptacles 114 to ports 175 (not shown).

All features which have been explained and shown in conjunction with the individual embodiments of the invention can be provided in different combinations in the subject matter according to the invention so as to simultaneously implement the advantageous effects of said features. The scope of protection of the present invention is defined by the claims and is not limited by the features explained in the description or shown in the figures.

| List of reference signs | |
| --- | --- |
| 100 | Valve control device |
| 110 | Housing |
| 112 | Mounting |
| 114 | Receptacle |
| 116 | Fluid flow duct portion |
| 118 | Fluid port |
| 120 | First valve |
| 122 | First engagement unit |
| 123 | Engagement contour |
| 125 | First functional element |
| 130 | Rotary slide valve |
| 150 | Second valve |
| 152 | Second engagement unit |
| 153 | Engagement contour |
| 155 | Second functional element |
| 160 | Rotary slide |
| 165 | Seal |
| 170 | Duct |
| 175 | Connector |
| 180 | Contour |
| 190 | Third valve |
| 192 | Third engagement unit |
| 193 | Engagement contour |
| 195 | Third functional element |
| 200 | Locking mechanism |
| 210 | Entrainment installation |
| 215 | Blocking unit |
| 220 | Locking contour |
| 230 | Locking face |
| 300 | Drive |
| 310 | Drive shaft |
| 400 | Heat exchanger |
| R1 | Rotation axis of the first functional element |
| R2 | Rotation axis of the second functional element |
| R3 | Rotation axis of the third functional element |
| RG | Rotation axis of the locking mechanism |

I claim:

1. Valve control device (100) for a coolant circuit of a motor vehicle, said valve control device (100) having:
a first valve (120) having an assigned first functional element (125) comprising a first engagement unit (122),
a second valve (150) having an assigned second functional element (155) comprising a second engagement unit (152),
wherein the first valve (120) and the second valve (150) in terms of a switch position thereof are configured so as to be variable by rotating the respective assigned functional element (125, 155),
a locking mechanism (200) comprising an entrainment installation (210), wherein the locking mechanism (200) is configured so as to be able to be driven by means of a drive (300),
wherein the locking mechanism (200) in a rotating movement, by means of the entrainment installation (210) engaging in the first engagement unit (122), is configured for transferring the first functional element (125) from a first switch position to a second switch position, and/or, by means of the entrainment installation (210) engaging in the second engagement unit (152), is configured for transferring the second functional element (155) from a first switch position to a second switch position, and
wherein the first engagement unit (122) of the first functional element (125) comprises a first number of engagement contours (123), and the second engagement unit (152) of the second functional element (125) comprises a second number of engagement contours (153), wherein the first number differs from the second number.

2. Valve control device (100) according to claim 1, wherein the locking mechanism (200) is configured as a locking contour (220) for bearing on a locking face (230) of the first functional element (125) and on a locking face (230) of the second functional element (155).

3. Valve control device (100) according to claim 2, wherein a spacing of a rotation axis (R1) of the first functional element (125) from a rotation axis (RG) of the locking mechanism (200) differs from a spacing of a rotation axis (R2) of the second functional element (155) from the rotation axis (RG) of the locking mechanism (200).

4. Valve control device (100) according to claim 2, wherein the first functional element (125) comprises an odd number of switch positions, and the second functional element (155) comprises an even number of switch positions.

5. Valve control device (100) according to claim 2, wherein the valve control device (100) comprises a terminal detent for calibrating.

6. Valve control device (100) according to claim 1, wherein a spacing of a rotation axis (R1) of the first functional element (125) from a rotation axis (RG) of the locking mechanism (200) differs from a spacing of a rotation axis (R2) of the second functional element (155) from the rotation axis (RG) of the locking mechanism (200).

7. Valve control device (100) according to claim 6, wherein the first functional element (125) comprises an odd number of switch positions, and the second functional element (155) comprises an even number of switch positions.

8. Valve control device (100) according to claim 6, wherein the valve control device (100) comprises a terminal detent for calibrating.

9. Valve control device (100) according to claim 1, wherein the first functional element (125) comprises an odd number of switch positions, and the second functional element (155) comprises an even number of switch positions.

10. Valve control device (100) according to claim 1, wherein the valve control device (100) comprises a terminal detent for calibrating.

11. Valve control device (100) according to claim 10, wherein the terminal detent is configured as a mechanical blocking unit (215) on the first functional element (125).

12. Valve control device (100) according to claim 1, having a third valve (190), wherein the third valve (190) is assigned a third functional element (195) comprising a third engagement unit (192).

13. Valve control device (100) according to claim 12, wherein the third functional element (195) comprises an even number of switch positions.

14. Valve control device (100) according to claim 1, wherein the first valve (120), the second valve (150) and a third valve (190) have in each case at least one rotary slide valve (130).

15. Valve control device (100) according to claim 1, wherein the first valve (120) has five switch positions.

16. Valve control device (100) according to claim 1, wherein the second valve (150) and a third valve (190) have in each case four switch positions.

17. Valve control device (100) according to claim 1, wherein the valve control device (100) comprises an additional valve which is configured so as to be activated by means of the locking mechanism (200).

18. Valve control device (100) according to claim 17, wherein the additional valve is configured as a proportional valve.

19. Valve control device (100) according to claim 1, having a housing (110), wherein the housing (110) has a mounting (112) for the locking mechanism (200) and in each case one receptacle (114) for each valve (120, 150, 190).

20. Valve control device (100) according to claim 19, wherein the housing (110) has a plurality of fluid flow duct portions (116) for fluidically connecting the receptacles (114) to one another or to a fluid port (118).

\* \* \* \* \*